G. J. SAYER.
RIND CUTTING MACHINE.
APPLICATION FILED JULY 11, 1914.
1,156,822.
Patented Oct. 12, 1915.
2 SHEETS—SHEET 2.
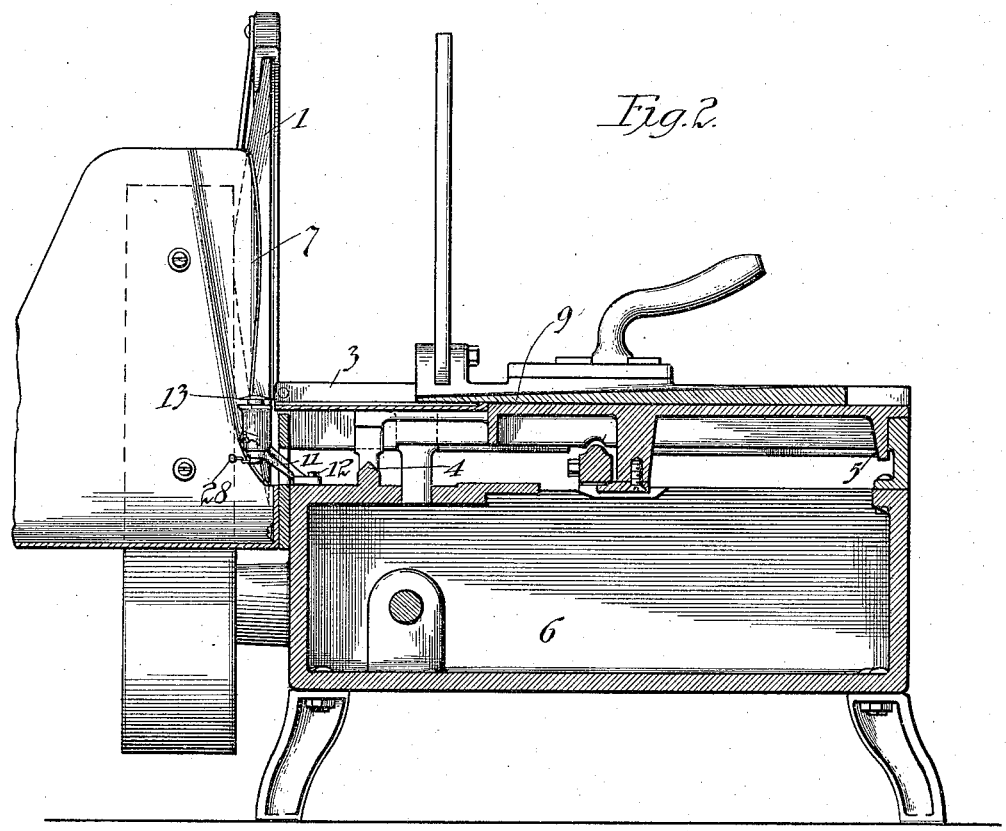
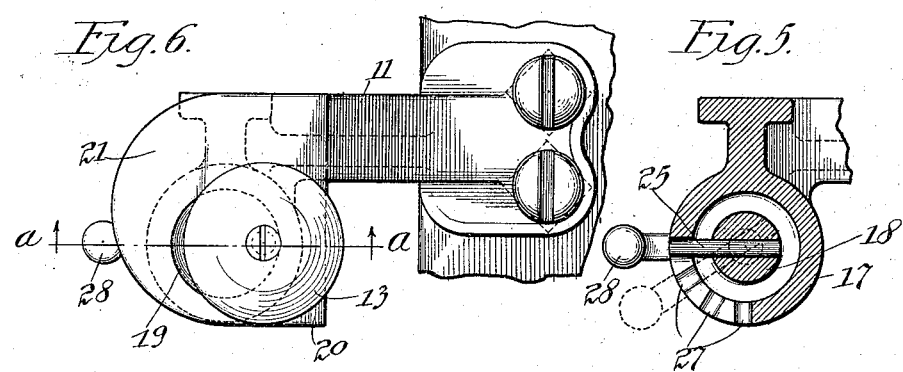
Witnesses:
Inventor:
George J. Sayer
by Max W. Zabel
Atty.

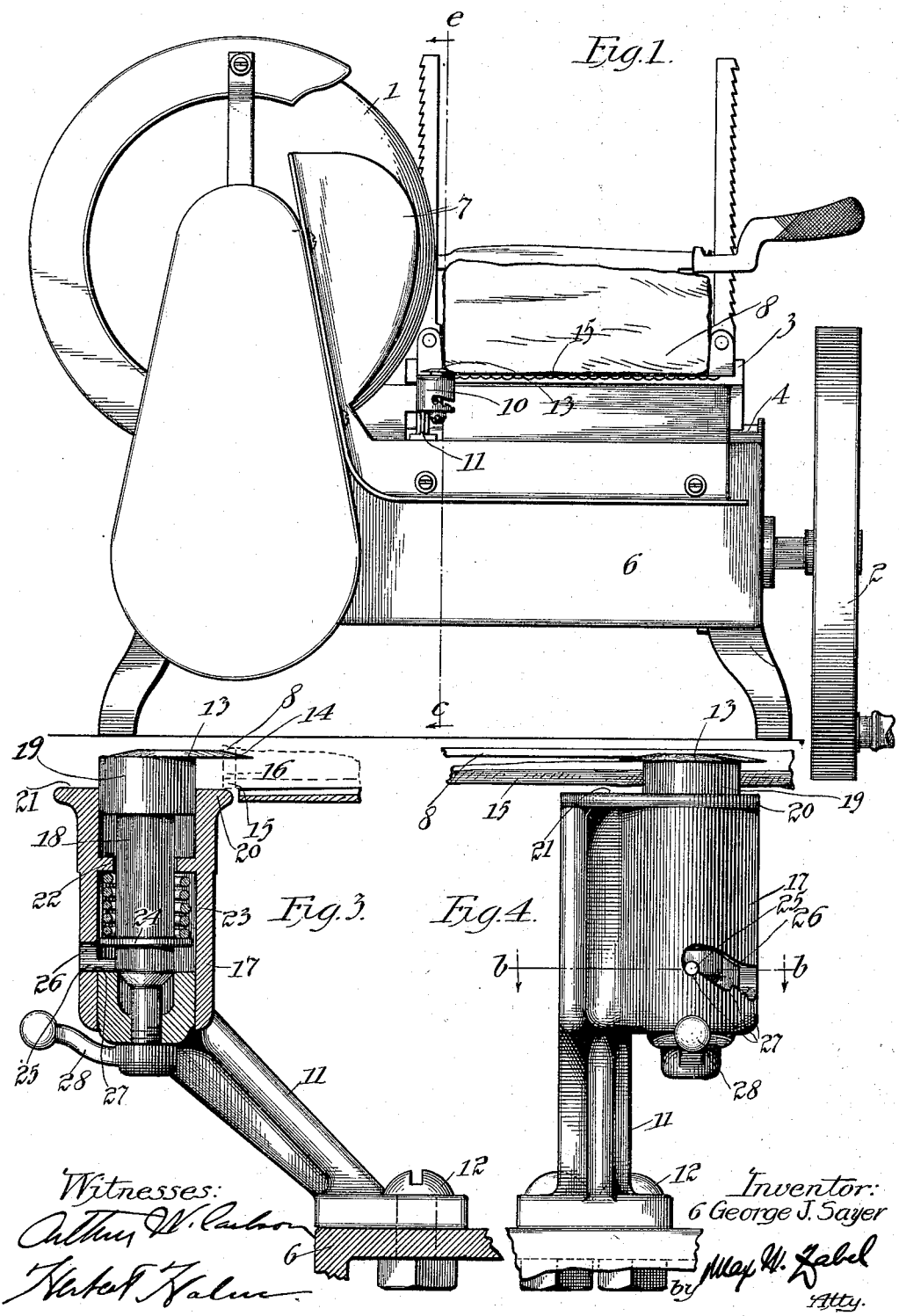

UNITED STATES PATENT OFFICE.

GEORGE J. SAYER, OF CHICAGO, ILLINOIS.

RIND-CUTTING MACHINE.

1,156,822.  Specification of Letters Patent.  Patented Oct. 12, 1915.

Application filed July 11, 1914. Serial No. 850,460.

*To all whom it may concern:*

Be it known that I, GEORGE JACOB SAYER, a citizen of the United States, residing at Chicago, in the county of Cook and State of Illinois, have invented a certain new and useful Improvement in Rind-Cutting Machines, of which the following is a full, clear, concise, and exact description, reference being had to the accompanying drawings, forming a part of this specification.

My invention relates to rind cutting machines, or rather to rind cutting attachments for meat slicing machinery, the object of the attachment being to provide mechanism to cut off a thin strip of the rind of the meat which is being cut in a slicing machine, the width of the strip being preferably equal to the thickness of the slice of meat and the thickness of the strip being dependent upon the thickness of rind which it is desired to eliminate. My improved mechanism has means whereby the thickness of the strip to be eliminated can be suitably controlled.

In the preferred form of my device it is attached preferably at that point of the slicing machine where it will become effective to make an incision in the meat just before the meat reaches the circular slicing knife. The piece of meat that thus reaches the slicing knife has an incision made in the rind so that the slicing knife when slicing off a slice of the meat, also slices off this thin strip of rind so that the meat slices need not thereafter be each separately cut to have the rind removed. It is of course of advantage not to remove the entire rind from the entire piece of meat because this rind protects the meat.

I will explain a form which my invention may take more in detail by referring to the accompanying drawings illustrating the same, in which—

Figure 1 is a side view of a slicing machine with my improved rind cutter in place; Fig. 2 is an end view partly in section to illustrate the application of my improved rind cutter to the machine; Fig. 3 is a sectional view of my improved rind cutter on line *a—a* of Fig. 6; Fig. 4 is an end elevation thereof; Fig. 5 is a cross-sectional view on line *b—b* of Fig. 4, and Fig. 6 is a top view of my improved rind cutter.

Referring more particularly to Figs. 1 and 2, the general views of the slicing machine include the rotatable knife 1 rotated through the interposition of suitable instrumentalities associated with the crank wheel 2 as well understood, the operation of this crank wheel at the same time reciprocating a table 3, which table slides upon the runways 4 and 5. These runways are provided upon a suitable base plate 6 of the machine. A suitable guard plate 7 is provided to deflect the cut slices of meat. The table is adapted to carry a piece of meat 8 suitably held in position upon a sliding carrier 9, which sliding carrier moves one notch to the left (Fig. 2) for every complete movement of the table 3. Slices of meat are thus cut off from the piece of meat 8 as is readily understood by those skilled in the art. My improved device 10 is carried by a suitable bracket 11, which bracket is fastened to the base plate 6 by means of the bolts 12 as readily apparent from Figs. 1 and 2. My improved device carries a flat knife 13 here shown to be circular in form although the particular outline is not of serious moment. This knife is adapted to have its right hand edge (Fig. 2) project into the path of the piece of meat 8 as it moves by toward the knife 1, thereby to cut an incision of the desired thickness throughout the length of the piece of meat 8. Then when this meat reaches the knife 1 and the slice is cut off, the part below the incision forms a little strip which is thus separate from the slice, this little strip forming the rind, the thickness of the strip depending upon how high the knife 13 is above the lower edge of the meat. Rinds of varying thickness may thus be cut off due to the adjustable feature of my improved device.

By referring more particularly to Fig. 4, it will be seen how the knife 13 makes the incision 14 between the piece of meat 8 and the rind strip 15.

By referring to Fig. 3 it will be seen that the thickness of the slice of meat 16 is shown by the dotted lines to indicate that the knife 13 makes an incision of slightly greater depth than the width of the slice.

My improved device as stated being mounted upon the arm 11 includes a barrel 17 within which a rod 18 is rotatably and slidably mounted, which rod carries at its upper enlarged head 19 a knife 13 which is eccentrically mounted with respect to the axis of the rod 18 as readily apparent from Fig. 6. Thus as the rod 18 is rotated, the knife 13 may be swung beyond the outer edge 20 of the surmounting plate 21 of the barrel 17 as shown more clearly in Figs. 3 and 6. When the rod 18 is moved in the opposite direction, the knife being eccentrically mounted, it can be withdrawn so that it does not overhang the edge 20. A projecting flange 22 also helps to guide the rod 18 and forms an abutment for one extremity of a spring 23, which spring at its opposite extremity presses against a collar 24 secured to the rod 18. The rod 18 also has a projecting stud or finger 25 which is operable within a groove 26 through the barrel 17. The barrel has a plurality of step-like stops 27 provided for engagement by the finger 25 so that the rod 18 may be held in varying positions of elevation to control the thickness of the strip of rind desired to be eliminated. The rod 18 has at its lowermost extremity a handle 28 by which it can be adjusted so that the finger 25 may occupy one or the other of the stops 27. In this way it will be clear that any suitable thickness of rind may be eliminated by controlling the height of the incision above the lower face of the piece of meat. The knife 13 is eccentrically mounted with respect to the rod 18 so that the width of the incision may be controlled and also so that this knife may occupy a resting position upon the top of the face plate 21 when the knife is not in use without having any portion of the knife project over the edge.

From what has been described it is thought the nature of my invention will be readily clear to those skilled in the art, as will also its various applications.

Having however thus described one form which my invention may take, what I claim as new and desire to secure by Letters Patent is:

1. A rind cutting attachment for meat slicing machines comprising a knife adapted to project into the path of the meat as it moves toward the slicing knife to cut an incision in said meat, a carrier for said knife, and means for actuating said carrier to move said knife into and out of the path of said meat and simultaneously raise and lower said knife to control the thickness of the rind strip.

2. A rind cutting attachment for meat slicing machines comprising a knife adapted to project into the path of the meat as it moves toward the slicing knife to cut an incision in said meat, a carrier for said knife upon which said knife is eccentrically mounted, and means for rotating said carrier and simultaneously raising or lowering the same to thereby control both the depth and the thickness of the rind strip.

3. A rind cutting attachment for meat slicing machines comprising a knife adapted to project into the path of the meat as it moves toward the slicing knife to cut an incision in said meat, a carrier for said knife upon which said knife is eccentrically mounted, a support for said carrier, and means including an inclined runway for rotating said carrier to thereby control the elevation of said knife and the depth of the projection of said knife into the meat.

4. A rind cutting attachment for meat slicing machines comprising a knife adapted to project into the path of the meat as it moves toward the slicing knife to cut an incision in said meat, a carrier for said knife upon which said knife is eccentrically mounted, a support for said carrier, and means including an inclined runway for rotating said carrier to thereby control the elevation of said knife and the depth of the projection of said knife into the meat, said inclined runway having a plurality of steps to serve as resting positions for said meat carrier.

5. A rind cutting attachment for meat slicing machines comprising a knife adapted to project in one of its limiting positions into the path of the meat as it moves toward the slicing knife to cut an incision in said meat, a face plate, a carrier for said knife, and means for actuating said carrier to project said knife into the path of the said meat and simultaneously raise said carrier, or to retract and lower the said knife whereby the said knife is lowered upon said face plate so that said face plate serves as a guard for the knife edge when not in use, said face plate having a size sufficient to project beyond the edge of said knife when said knife is in its lowermost position thereon.

In witness whereof, I hereunto subscribe my name this seventh day of July A. D., 1914.

GEORGE J. SAYER.

Witnesses:
Wm. A. Chapin,
John M. Peterson.

Copies of this patent may be obtained for five cents each, by addressing the "Commissioner of Patents, Washington, D. C."